United States Patent [19]
Hippeläinen

[11] Patent Number: 5,745,853
[45] Date of Patent: Apr. 28, 1998

[54] METHOD FOR ALLOCATING RADIO CHANNELS IN A QUASI-TRANSMISSION-TRUNKED MOBILE COMMUNICATION SYSTEM

[75] Inventor: Leo Hippeläinen, Helsinki, Finland

[73] Assignee: Nokia Telecommunication Oy, Espoo, Finland

[21] Appl. No.: 602,837

[22] PCT Filed: Jun. 26, 1995

[86] PCT No.: PCT/FI95/00368

§ 371 Date: Feb. 27, 1996

§ 102(e) Date: Feb. 27, 1996

[87] PCT Pub. No.: WO96/00482

PCT Pub. Date: Jan. 4, 1996

[30] Foreign Application Priority Data

Jun. 27, 1994 [FI] Finland ................................. 943087

[51] Int. Cl.⁶ ........................... H04Q 7/20; H04B 7/00
[52] U.S. Cl. ........................... 455/450; 455/517
[58] Field of Search ................... 455/33.1, 34.1, 455/34.2, 56.1, 58.1, 62, 63, 422, 450, 524

[56] References Cited

U.S. PATENT DOCUMENTS

| | | | |
|---|---|---|---|
| 4,646,345 | 2/1987 | Zdunek et al. | 455/33.1 |
| 5,159,702 | 10/1992 | Aratake | 455/33.1 |

FOREIGN PATENT DOCUMENTS

| | | |
|---|---|---|
| 88/08646 | 11/1988 | WIPO. |
| 88/08648 | 11/1988 | WIPO. |

OTHER PUBLICATIONS

Patent Abstract of Japan, vol. 7, No. 226, E-202, Abstract of JP, A, 58-11744 (Nippon Denki K.K.), 13 Jul. 1983.

Primary Examiner—Reinhard J. Eisenzopf
Assistant Examiner—Sam Bhattacharya
Attorney, Agent, or Firm—IP Group of Pillsbury Madison & Sutro LLP

[57] ABSTRACT

A method for allocating radio channels in a quasi-transmission trunked mobile communication system including base stations and a first mobile station communicating with the base stations using radio channels, and at least one other mobile station requiring a radio channel. In the method, a radio channel is kept reserved for such a call in which the first mobile station is participating. This radio channel is allocated for the first mobile station for the duration of its call transaction. The first mobile station terminates and its call transaction, the radio channel is kept reserved for a predetermined time for the call. For accelerating allocation of new call transactions, it is checked whether the radio channel may still be kept reserved for the call. If the radio channel may still be kept reserved for the call, time-out time ($T_s$) for a call transaction depending on the traffic load of the radio channels is calculated, and the channel is kept reserved for the time corresponding to the calculated time-out time, subsequent to which the radio channel is released. If the radio channel may no longer be kept reserved for the call, the radio channel is released.

8 Claims, 3 Drawing Sheets

METHOD FOR ALLOCATING RADIO CHANNELS IN A QUASI-TRANSMISSION-TRUNKED MOBILE COMMUNICATION SYSTEM

This application claims benefit of international application PCT/FI95/00368, filed Jun. 26, 1995.

FIELD OF THE INVENTION

The invention relates to a method for allocating radio channels in a quasi-transmission trunked mobile communication system comprising base stations and a first mobile station communicating with the base stations by means of radio channels, and at least one other mobile station requiring a radio channel. In the method, a radio channel is kept reserved for such a call in which the first mobile station is participating, the radio channel is allocated for the first mobile station for the duration of its call transaction, the first mobile station terminates its call transaction, and the radio channel is kept reserved for a predetermined time for the call.

BACKGROUND OF THE INVENTION

A call refers to complete exchange of information between two or more parties. A call, in turn, may consist of one or more call transactions (speech items). In a semi-duplex call these transactions are sequential. A call transaction refers generally to all functions associated with complete unidirectional transmission of information during a call.

In a trunked radio system, several user groups, even several user organizations share a common pool of channels. In a transmission trunking procedure, a group of simultaneous calls shares a certain group of traffic channels so that for each call, a traffic channel is allocated separately for each call transaction, i.e. each activation of the push-to-talk switch from this group. The traffic channel is de-allocated immediately at the end of the call transaction, i.e. when the push-to-talk switch is released and one stops speaking. Between the call transactions, the mobile radio station participating in the call shifts to a listening state onto a control channel. It is typical of transmission trunking that a channel may be allocated with only a little signalling if a call is going on.

On account of transmission trunking, for instance, more than four calls may, in principle, be allowed simultaneously in a 4-channel system.

In trunked radio systems of this kind, a message trunking procedure is usually employed in which a traffic channel is allocated permanently for one call for the entire duration of the call, whereby the call may contain several separate call transactions, i.e. several activations of the push-to-talk switch at various terminal devices. The channel is de-allocated or released only when the call is explicitly terminated or possible time supervision expires. When the message trunking principle is utilized, the number of simultaneous calls is limited to the number of traffic channels.

The invention relates to a trunked radio system of the type in which on at least some of the traffic channels, a so-called transmission trunking procedure is utilized, in which the number of simultaneous calls may exceed the number of available traffic channels so that for a call, a traffic channel is allocated separately for each call transaction, i.e. each activation of the push-to-talk switch. The traffic channel is immediately de-allocated at the end of the call transaction, i.e. when one releases the push-to-talk switch and stops speaking. Between the call transactions, the mobile station MS participating in the call goes to a control channel. Operations similar to transmission trunking are disclosed e.g. in Finnish patent application 925,430, which is corresponding to international application PCT/FI93/00500. A version of transmission trunking is so-called quasi-transmission trunking, which is otherwise similar to conventional transmission trunking, but channel de-allocation is delayed for a short period at the end of the call transaction, i.e. after releasing the push-to-talk switch. During this "delay-time" the channel allocation may be re-used for a new call transaction that is a part of the same call. Quasi-transmission trunking is disclosed, e.g. in the description of U.S. Pat. No. 4,646,345.

In prior art methods, the procedure is the following. When the user presses the push-to-talk switch of his or her radio telephone or mobile station, the telephone signals to the trunking system controller that the user, wants to speak. Either the system (a call has been set-up previously, i.e. call transactions have taken place) or the radio telephone (whereby the number of user B is transmitted by means of signalling from the radio telephone to the system) knows where one wants to establish a connection, and it is established by paging user B or users B in case of a group call, by allocating radio channels, and if the parties of the call are located within the areas of different exchanges, searching the trunk circuits required between the exchanges, and other connections. In addition, the radio telephones are commanded onto the allocated radio channel. Since the allocation procedure of all resources requires a time of some second, particularly in calls between several exchanges, it is advantageous to keep the connections reserved for a while after the termination of the previous call interaction, although they are not used for transmitting speech, as one, or some party in case of a group call, probably wants to say something as a response to the previous call transaction. It is thus acted according to the so-called quasi-transmission trunking method described above. A normal transmission trunking method has no delay-time. In prior art implementation ideas, the delay-time for channel allocating has been fixed or determined by a fixed parameter.

In that case, if the previous call transaction has followed after a very long time from the previous one, the resources of the call, i.e. radio channels and transmission links have already been released, and their re-allocation has lasted at least said one second. This may have resulted in fading of the beginning of the call transaction, since the connection has not been yet established when user A has already said his or her speech item onto the channel. A situation of this kind may be crucial i.e. in a siege situation involving the police where a complete call interaction to be uttered is: "Cease fire!", and the part of the call transaction that passes through the radio channel and the system, and is thus cut from its beginning and heard by a sharp-shooter: "fire!"

SUMMARY OF THE INVENTION

The object of this invention is to implement a mobile communication system and a channel allocating method that employs the principle of quasi-transmission trunking and avoids the problems associated with prior art.

The object of the invention is to carry out a method that enables avoiding the problem of quasi-transmission trunking of prior art, i.e. the slowness of allocating call transactions, or radio channels, i.e. call establishment in cases where the radio channels are already released after the delay-time from the time of termination of the last call transaction.

This novel method for allocating radio channels in a quasi-transmission trunked mobile communication system is achieved with the method of the invention, which is characterized in that it is checked whether the radio channel may still be kept reserved for the call, and if the radio channel may still be kept reserved for the call, a time-out time for a call transaction depending on the traffic load of the radio channels is calculated, and the channel is kept reserved for the duration of the calculated time-out time, subsequent to which the radio channel is released, and, again, if the radio channel may no longer be reserved for the call, the radio channel is released.

The invention is based on the idea that the time-out time subsequent to the termination of a call during which time the channel is still available for use of a certain call transaction is made dependent on the traffic load of the radio channels of the system.

This is based on the idea that releasing channel resources is unnecessary if they are not re-used immediately. In prior art solutions, since the time-out time is independent of the allocation state of the resources, radio channels are very often completely released, and when a mobile station participating in a call has requested for a call transaction, it has been necessary to re-allocate the radio channels.

In accordance with the invention, however, it is not necessary to maintain a call for an undetermined time although there is no other traffic load, as interferences on the radio path or a poor reception level on the peripheral areas may result in partial failure in signalling. Thus, a radio telephone automatically seeks back onto the control channel after a while in the method of the invention, as well.

In the method in accordance with the invention, available connection capacity is used for accelerating switching of a new call transaction by prolonging the time prior to releasing the connections after the previous call transaction, although a new call transaction would not follow immediately subsequent to the previous one. If the connections are released, reestablishing the connection for a call requires a longer time than changing a new participant for an ongoing call.

The advantage of a method of this kind for allocating radio channels in a quasi-transmission trunked mobile communication system compared with systems based on fixed time-out times is that the radio channels and other resources are not allowed to be out of use, but they are kept in standby state for continuing the same call with a new call transaction. This is an intermediate form of a transmission trunked system and a conventional radio system: if transmission trunking were not in use, the resources would be reserved for the entire duration of a call. So are they in a method that functions in accordance with this invention if there are no other suitable users for the resources and the interval of the call transactions is shorter than the longest time supervision.

BRIEF DESCRIPTION OF THE DRAWINGS

In the following, the invention will be described in greater detail with reference to the attached drawings, in which.

DETAILED DESCRIPTION OF PREFERRED EMBODIMENTS OF THE INVENTION

Figure 1:
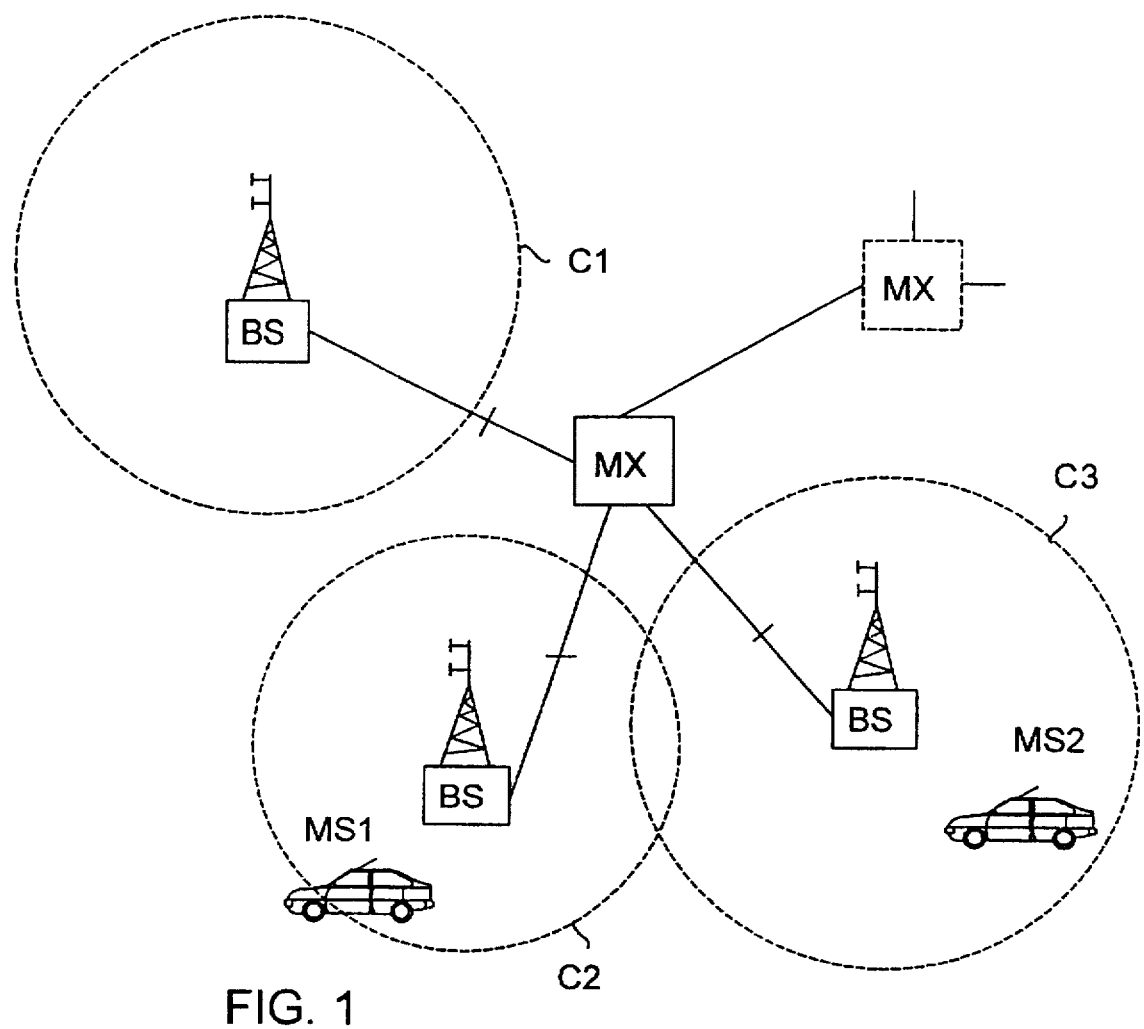
FIG. 1 illustrates a radio system in which the invention may be applied.

FIG. 1 shows a trunked radio telephone system, in which the geographical area covered by the system is divided into smaller radio areas or radio cells C1, C2 and C3, which may be separate from each other, defined by each other or overlapping in their peripheral areas. Each cell C1, C2, C3 contains at least one fixed, typically multichannel, transceiver device BS, which is termed a base station. All base stations BS are connected by fixed transmission links, such as cables, to a mobile exchange MX or a trunking system controller, which controls the operation of the base stations BS. The base stations BS communicate via a radio connection with subscriber mobile stations MS moving freely within the system on radio channels, i.e. frequencies or time-slots assigned to the system.

Figure 2:
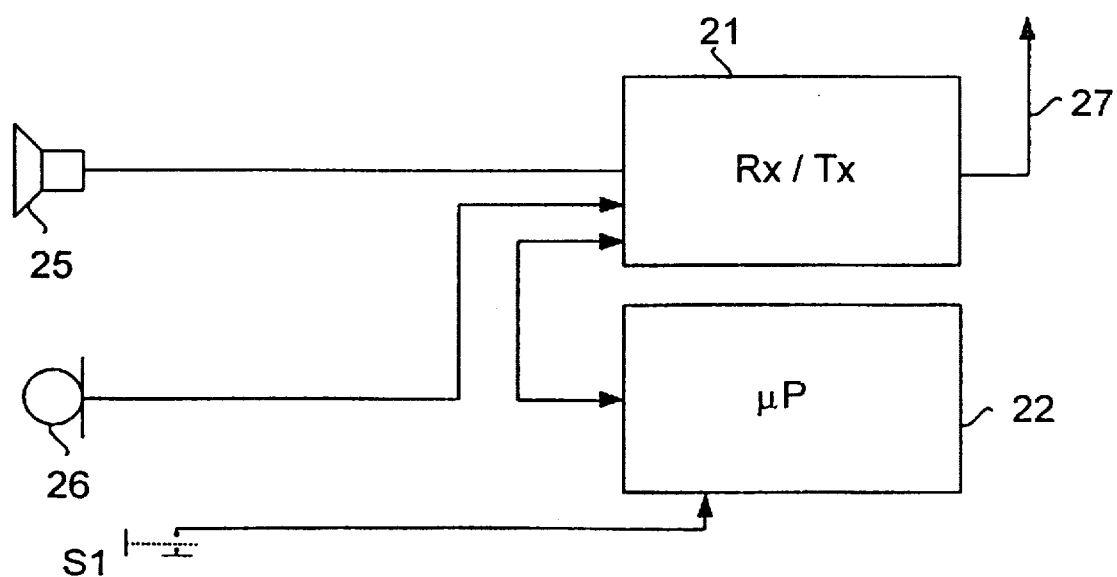
FIG. 2 is a general block diagram of a mobile station i.e. a mobile radio station.

A mobile station MS may be of any type depending on the radio system. FIG. 2 schematically illustrates a mobile station or a subscriber station MS, in which the invention may be applied. An MS comprises a transceiver 21 connected with an antenna 27, the receiver being connected to a loudspeaker 25 and the transmitter to a microphone 26. The MS is controlled by a microprocessor 22, which handles the signalling transmitted and received by the transceiver 21. The subscriber station MS further comprises a push-to-talk switch S1, i.e. a switch which is activated (turned off) by the user while speaking. The microprocessor 22 detects activation of the push-to-talk switch S1 and initiates measures for establishing a call transaction. When the microprocessor 22 detects that the push-to-talk switch S1 is released, it accordingly initiates the necessary measures for terminating the call transaction.

Figure 3:
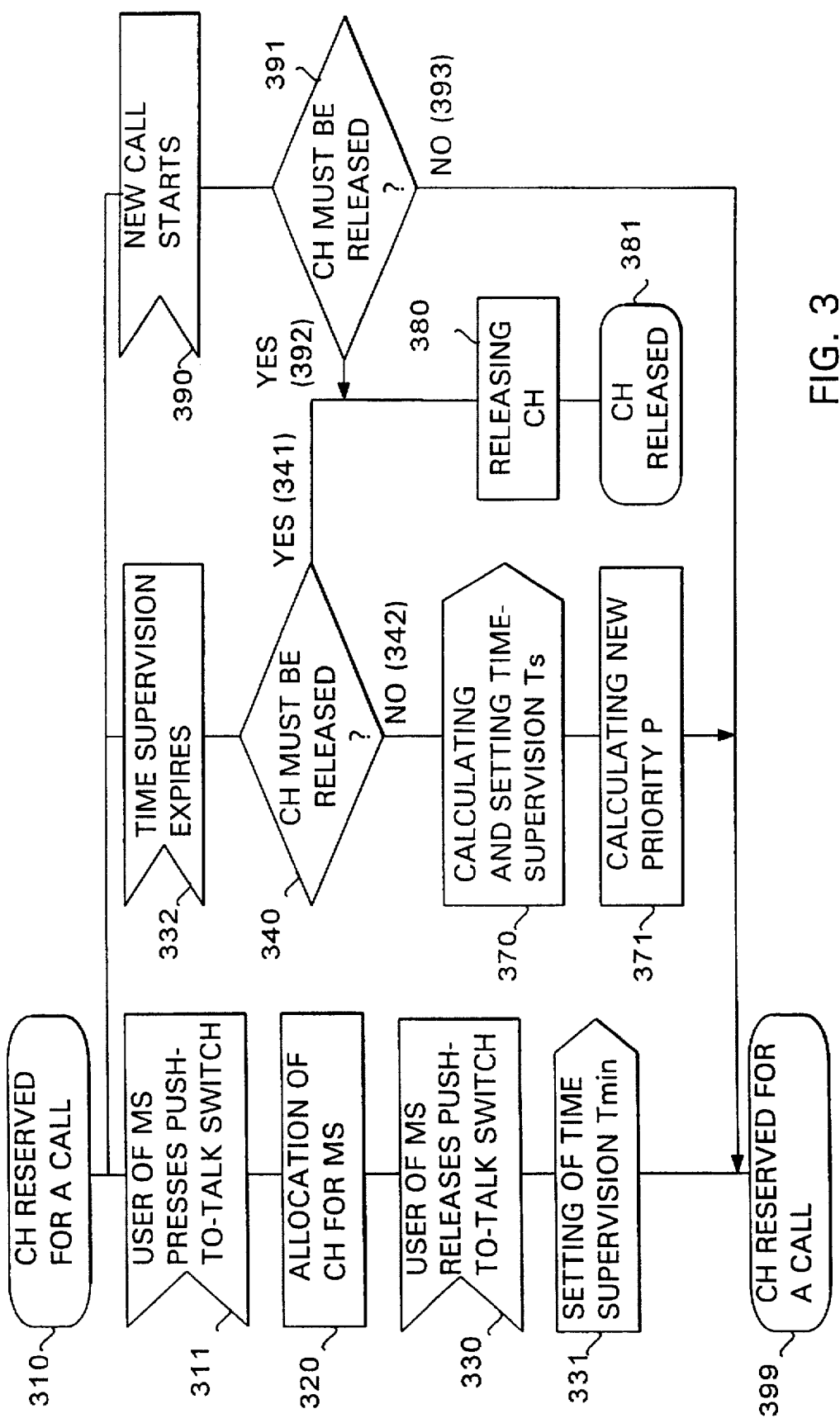
FIG. 3 shows a flow diagram of the operation of a method of the invention.

FIG. 3 shows a flow diagram of the operation of a method of the invention. In phase 310, a radio channel CH is kept reserved for such a call in which a first mobile station MS1 is participating. When a user of the mobile station wants to start a new call transaction, he or she presses 311 a push-to-talk switch and the mobile station transmits a call transaction request to the mobile communication system. As a result, in phase 320, the radio channel is allocated for the (first) mobile station for the duration of the call transaction of the mobile station MS1. Subsequent to this, the first mobile station terminates its call transaction and releases its push-to-talk switch 330. Next, time supervision 331 $T_{min}$ is set, and starts to operate immediately, and the radio channel CH used is kept reserved for a predetermined time $T_{min}$ for the call. Next, either the time supervision $T_{min}$ expires 332 or a new call starts 390. If the time supervision expires 332 prior to the start of a new call, the method goes to the termination phase 340. It is therein checked, whether the radio channel CH used may still be kept reserved for the ongoing call. These checks correspond to checking 340 whether the channel reserved for the call must be released. These checks are disclosed below. If the radio channel may still be kept reserved 342 for an ongoing call, i.e. the channel does not have to be released for the use of a new call, a value for time supervision $T_s$ is calculated 370 depending on the traffic load of the radio channels and indicating for how long the channel may be kept reserved for that call before a new value for time supervision $T_s$ must be calculated. In other words, if the channel CH is not to be released 334, the channel CH is kept 370 reserved for a time corresponding to a new, re-calculated time supervision $T_s$, until this time supervision expires in phase 332, subsequent to which the operation of the method of the invention continues in the way set forth above. If, however, the radio channel may no longer 341 be kept reserved for the call, i.e. if the channel is to be released 341, the operation of the method goes directly to phase 380 and the radio channel is released for the use of other calls or connection needs 381. The time-out time TOT is the sum of the time supervision values $T_s$ calculated successively after the termination of the call transaction until the decision to release said channel.

If, again, a new call 390 starts prior to the termination of the time supervision, it is examined 391 whether the channel must be released for the use of the new call, and that being so 392, the operation of the method goes to phase 380. If, however, the channel is not to be released 393, the channel is still kept 399 reserved for the call.

In phase 340, it is checked whether the radio channel CH used may still be kept reserved for the call. That check is carried out in such a way that it is checked whether there are still free radio channels available at the base station via which the mobile station is communicating. If there are free radio channels, i.e. frequencies or time-slots available, it is stated that the radio channel may still be kept reserved for the call. If, again, free channels are still not available, it is stated that the channel may no longer be kept reserved for the call.

The check carried out in phase 340 wherein it is checked whether the radio channel may still be kept reserved for the already established call may also be carried out in such a way that the priority of the call maintained is compared with the priorities of other calls awaiting a free radio channel. As a result of the comparison of priorities, provided that the priority of said call is higher than the priority of some other call awaiting a free radio channel, it is stated that the radio channel may still be kept reserved for the use of the call.

On the other hand, after the completed comparison, provided that the priority of the call is lower than the priority of the call awaiting a free radio channel, it is stated that the radio channel may no longer be kept reserved for the use of that call.

In phase 340, when evaluating whether a channel is to be released, the priority of the established call and the priority of a possible new call requiring a channel may be taken into account. Thus, if the priority of the new call requiring a channel is higher of these two, it is stated that the channel is to be released 341, and, again, if the priority of the ongoing call is higher than the priority of the new call requiring a channel, the channel CH still remains reserved for the ongoing call, and a new value for time supervision $T_s$ is calculated. Thus, on each implementation cycle of the method when a new value for time supervision $T_s$ is calculated, the priority of an existing call may simultaneously be lowered on an appropriate way so that the priority of a new call more easily exceeds the priority of the existing call, in which case the channel is released next, and the channel is allocated for the use of the new call.

In an embodiment of the invention, the check in phase 340 for checking whether the radio channel may still be reserved for the call is carried out after the expiry of the time supervision $T_s$ initiated at the termination of the call transaction of a mobile station.

In a radio telephone system, the following parameters may be factors to be taken into account when the time-out time (TOT=Time Out Time) is calculated in phase 370 of the described method:

| | |
|---|---|
| $P_c$ | actual priority of a call (0 ... $P_{max}$) |
| $P_{max}$ | maximum priority of calls |
| $R_{tot}$ | total allocation rate of the radio channels (0 ... 100%) |
| $L_{tot}$ | total allocation rate of the trunk circuits (0 ... 100%) |
| $R_p$ | allocation rate of the radio channels, taking into account calls having the same or a higher priority as the call in question (0 ... 100%) |
| $L_p$ | allocation rate of the trunk circuits, taking into account calls having the same or a higher priority compared with the call in question (0 ... 100%) |
| $T_{max}$ | time supervision of a radio telephone that forces onto a control channel |
| $T_{min}$ | time-out time for a call transaction, may be set by means of a parameter. |

The length of the time-out time is calculated after the termination of the call transaction, for the first time after the time $T_{min}$. If resource queuing is included as a part of the system, it is checked whether there is a queue for the resources used by the call and whether the priority of the new calls in the queue is higher than that of a terminated call transaction or that of an presently ongoing call a part of which the call transaction is. If a call or a call transaction may be carried out by releasing the resources, the resources are assigned to the use of the new call, and they are not kept assigned for the original call. On the other hand, if there are no sufficiently important users requiring resources, the resources are not released, and the resources, e.g. radio channels may still be in the use of the original, established call.

On evaluating whether the resources are assigned to the use of a new call or whether they are kept reserved for the original call, the priority of a call may be taken into account in such a way that releasing the resources is re-checked after the time supervision $T_s$. Subsequent to this new check or calculation, if the resources still do not need to be released, a calculatory priority P is decreased by one, or some other value used as a priority parameter in the system. The actual priority of the call $P_c$ is set as the initial value of the calculatory priority P. The time $T_s$ of the time supervision is determined on the basis of the priority P of the call, the realized time-out time $T_w$, and the maximum time-out time $T_{max}$. Thus, the time supervision value may be calculated e.g. by means of the following formulas:

$$T_s=(T_{max}*0.9-T_w)/P \text{ or } T_s=(T_{max}*0.9-T_w)/2.$$

One or more time supervision values $T_s$ compose a complete time-out time. The first formula shown takes into account the priority of the established call, which is indicated by a divisor P. The latter formula assigns resources more slowly for the use of the calls having a lower priority, since an integer 2 is used as the divisor. The coefficient 0.9 used in the formulas ensures that the connection is always released before the time supervision of the radio telephone expires.

Besides on the expiry of the time supervision, it must also be calculated on establishing a new call transaction or a new call whether resources may be obtained for a new call by releasing them from reserved channels in state subsequent to a call transaction.

The drawings and the description associated therewith are only intended to illustrate the idea of the invention. The method of the invention for allocating radio channels may vary in its details within the scope of the claims. Although the invention has been described above mostly in connection with trunked radio systems, the invention may also be utilized in mobile communication systems of other kinds.

I claim:

1. A method for allocating radio channels in a quasi-transmission trunked mobile communication system comprising base stations and a first mobile station communicating with the base stations by means of radio channels, and at least one other mobile station requiring a radio channel, the method comprising the steps of keeping a radio channel reserved for such a call in which the first mobile station is participating, allocating said radio channel for the first mobile station for the duration of its call transaction, terminating the call transaction of the first mobile station, keeping said radio channel reserved for a predetermined time for said call, checking whether said radio channel may still be kept reserved for said call, if said radio channel may still be kept reserved for said call, calculating time-out time for a call transaction depending on the traffic load of the radio channels and keeping said channel reserved for the duration of the calculated time-out time, subsequent to which the radio channel is released, and if, again, said radio channel may no longer be kept reserved for said call, releasing said radio channel;

the step of checking whether said radio channel may still be kept reserved for said call being carried out by comparing the priority of said call in which the first mobile station is participating with the priorities of other calls awaiting a free radio channel; and the step of checking whether said radio channel may still be kept reserved for said call being carried out after the expiry of the time supervision initiated at said terminating of the call transaction of the first mobile station.

2. A method as claimed in claim 1, wherein, as a result of said comparison, if the priority of said call is higher than the priority of a call awaiting a free radio channel, it is stated that said radio channel may still be kept reserved for the use of said call.

3. A method as claimed in claim 1, wherein, as a result of said comparison, if the priority of said call is lower than the priority of a call awaiting a free radio channel, it is stated that said radio channel may no longer be kept reserved for the use of said call.

4. A method as claimed in claim 1, wherein said time supervision value is calculated in accordance with the following formula:

$$T_s = (T_{max} * 0.9 - T_w)/P,$$

in which

| | |
|---|---|
| $T_s =$ | total time of time supervision, |
| $T_{max} =$ | the duration of the time supervision of a mobile station that forces onto a control channel, |
| $T_w =$ | a realized time-out time, |
| $P =$ | the priority of a call. |

5. A method as claimed in claim 1, wherein said time supervision value is calculated in accordance with the following formula:

$$T_s = (T_{max} * 0.9 - T_w)/2,$$

in which

| | |
|---|---|
| $T_s =$ | total time of time supervision, |
| $T_{max} =$ | the duration of the time supervision of a mobile station that forces onto a control channel, |
| $T_w =$ | a realized time-out time. |

6. A method for allocating radio channels in a quasi-transmission trunked mobile communication system comprising base stations and a first mobile station communicating with the base stations by means of radio channels, and at least one other mobile station requiring a radio channel, the method comprising the steps of keeping a radio channel reserved for such a call in which the first mobile station is participating, allocating said radio channel for the first mobile station for the duration of its call transaction, terminating the call transaction of the first mobile station, keeping said radio channel reserved for a predetermined time for said call, checking whether said radio channel may still be kept reserved for said call, if said radio channel may still be kept reserved for said call, calculating time-out time for a call transaction depending on the traffic load of the radio channels and keeping said channel reserved for the duration of the calculated time-out time, subsequent to which the radio channel is released, and if, again, said radio channel may no longer be kept reserved for said call, releasing said radio channel;

the step of checking whether said radio channel may still be kept reserved for said call being carried out by comparing the priority of said call in which the first mobile station is participating with the priorities of other calls awaiting a free radio channel; and said time-out being calculated after said terminating of the call transaction of the first mobile station after a predetermined minimum time-out time.

7. A method as claimed in claim 6, wherein the step of checking whether said radio channel may still be kept reserved for said call is carried out by checking whether there are still free radio channels available, and that being so, stating that said radio channel may still be kept reserved for said call, and, again, if there are no free channels available, stating that said channel may no longer be kept reserved for said call.

8. A method as claimed in claim 6, wherein said time-out time is calculated depending on the traffic load of the priority of said call transaction.

* * * * *

UNITED STATES PATENT AND TRADEMARK OFFICE
CERTIFICATE OF CORRECTION

PATENT NO. : 5,745,853
DATED : Apr. 28, 1998
INVENTOR(S) : Leo Hippelainen

It is certified that error appears in the above-identified patent and that said Letters Patent is hereby corrected as shown below:

On title page, item [73]:   Please change the Assignee's Name to:

-- Nokia Telecommunications Oy --

Signed and Sealed this

Twenty-ninth Day of December, 1998

Attest:

BRUCE LEHMAN

Attesting Officer

Commissioner of Patents and Trademarks